(12) United States Patent
Duan et al.

(10) Patent No.: US 9,869,559 B2
(45) Date of Patent: Jan. 16, 2018

(54) METHOD AND SYSTEM FOR OBTAINING TRAJECTORY PATTERN OF ROUTE

(71) Applicant: INTERNATIONAL BUSINESS MACHINES CORPORATION, Armonk, NY (US)

(72) Inventors: Ning Duan, Beijing (CN); Wei Shan Dong, Beijing (CN); Peng Gao, Beijing (CN); Shi Lei Zhang, Beijing (CN); Xin Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 14 days.

(21) Appl. No.: 14/809,383

(22) Filed: Jul. 27, 2015

(65) Prior Publication Data

US 2016/0033292 A1  Feb. 4, 2016

(30) Foreign Application Priority Data

Jul. 30, 2014 (CN) .......................... 2014 1 0369446

(51) Int. Cl.
| | |
|---|---|
| *G06F 19/00* | (2011.01) |
| *G01C 21/34* | (2006.01) |
| *G01C 21/28* | (2006.01) |
| *G01C 21/30* | (2006.01) |
| *G08G 1/01* | (2006.01) |
| *G08G 1/13* | (2006.01) |

(52) U.S. Cl.
CPC .............. *G01C 21/34* (2013.01); *G01C 21/28* (2013.01); *G01C 21/30* (2013.01); *G08G 1/0112* (2013.01); *G08G 1/13* (2013.01)

(58) Field of Classification Search
CPC ............ G01C 21/3492; G01C 21/3415; G01C 21/32; G01C 21/34; G01C 21/3484; G01C 21/3469; G01C 21/3691; G01C 21/20; G01C 21/26; G01C 21/3461; G01C 21/3476; G01C 21/3617; G01C 21/3679; G01C 21/165
USPC .................. 701/533, 537, 70, 416, 527, 400
See application file for complete search history.

(56) References Cited

U.S. PATENT DOCUMENTS

| | | | | |
|---|---|---|---|---|
| 6,385,539 | B1 * | 5/2002 | Wilson ................... | G01C 21/30 340/905 |
| 6,856,897 | B1 * | 2/2005 | Phuyal ................... | G06T 17/05 340/995.24 |
| 7,656,857 | B2 * | 2/2010 | Thubert .................. | H04L 45/12 370/238 |

(Continued)

*Primary Examiner* — Ronnie Mancho
(74) *Attorney, Agent, or Firm* — Cantor Colburn LLP; Rabin Bhattacharya (57) ABSTRACT

A method and system for obtaining a trajectory pattern of a route. One embodiment of the present invention provides a method for obtaining a trajectory pattern of a route. The method includes obtaining a set of points associated with the route, the set of points being obtained by at least one entity travelling along the route. A plurality of coverage areas covering a part of points in the set of points is determined. The coverage areas are connected based on main directions of the coverage areas to obtain the trajectory pattern related to the route. The main directions represent forward directions of the route in respective coverage areas. A corresponding system for obtaining a trajectory pattern of a route is described as well.

20 Claims, 3 Drawing Sheets

(56) References Cited

U.S. PATENT DOCUMENTS

| | | | | |
|---|---|---|---|---|
| 2006/0217879 A1* | 9/2006 | Ikeuchi | | G01C 21/32 701/409 |
| 2007/0171095 A1* | 7/2007 | Mochizuki | | G08G 1/0104 340/995.13 |
| 2008/0117824 A1* | 5/2008 | Chakrabarti | | H04L 45/123 370/238 |
| 2008/0195428 A1* | 8/2008 | O'Sullivan | | G06Q 10/00 705/6 |
| 2009/0005961 A1* | 1/2009 | Grabowski | | G01C 21/365 701/532 |
| 2010/0049431 A1* | 2/2010 | Zetune | | G01C 21/20 701/532 |
| 2010/0064373 A1* | 3/2010 | Cai | | G06F 21/6254 726/26 |
| 2010/0205541 A1* | 8/2010 | Rapaport | | G06Q 10/10 715/753 |
| 2011/0060750 A1* | 3/2011 | Kuhn | | G06F 17/30961 707/758 |
| 2011/0106416 A1* | 5/2011 | Scofield | | G08G 1/0104 701/119 |
| 2011/0307166 A1* | 12/2011 | Hiestermann | | G01C 21/32 701/119 |
| 2012/0072107 A1* | 3/2012 | Okude | | G01C 21/343 701/416 |
| 2012/0095682 A1* | 4/2012 | Wilson | | G01C 21/32 701/532 |
| 2012/0116678 A1* | 5/2012 | Witmer | | G01C 21/32 702/5 |
| 2012/0190386 A1* | 7/2012 | Anderson | | G01C 15/04 455/456.3 |
| 2013/0285855 A1* | 10/2013 | Dupray | | G01S 19/48 342/451 |
| 2014/0335897 A1* | 11/2014 | Clem | | G08G 1/0112 455/456.3 |
| 2015/0262480 A1* | 9/2015 | Fowe | | G01C 21/3492 701/117 |
| 2015/0308846 A1* | 10/2015 | Ding | | G01C 21/3492 701/424 |
| 2015/0312327 A1* | 10/2015 | Fowe | | H04L 67/10 701/23 |
| 2015/0377629 A1* | 12/2015 | Duan | | G01C 21/32 701/532 |
| 2015/0377636 A1* | 12/2015 | Ding | | G01C 21/30 701/532 |
| 2015/0379410 A1* | 12/2015 | Dong | | G06N 7/00 706/58 |
| 2016/0021637 A1* | 1/2016 | Cao | | G01S 5/0278 455/440 |
| 2016/0033292 A1* | 2/2016 | Duan | | G01C 21/34 701/533 |
| 2016/0033298 A1* | 2/2016 | Duan | | G01C 21/3691 701/533 |
| 2016/0034305 A1* | 2/2016 | Shear | | G06F 9/50 707/722 |
| 2016/0034558 A1* | 2/2016 | Duan | | G06F 17/30598 707/738 |

* cited by examiner

METHOD AND SYSTEM FOR OBTAINING TRAJECTORY PATTERN OF ROUTE

CROSS-REFERENCE TO RELATED APPLICATION

This application claims the benefit of priority from Chinese Patent Application No. 201410369446.1, filed Jul. 30, 2014, the contents of which are incorporated herein by reference.

TECHNICAL FIELD

The present invention relates to a method and system for obtaining a trajectory pattern of a route.

BACKGROUND

A trajectory pattern of a route refers to data describing the shape and/or direction of the route. For example, the trajectory pattern can include the segments through which the route passes and the directions of the segments. The trajectory pattern has a variety of purposes. For example, it can match a location of a vehicle or a user sensed using a technology such as Global Positioning System (GPS) to a corresponding location on the route. Generally, the trajectory pattern is crucial to many applications such as vehicle tracking, fleet management, and the like.

It is rather time-consuming and laborious to obtain a trajectory pattern manually. Besides, a manually collected trajectory pattern hardly satisfies the practical demands on accuracy. For bus lines in a city, there could be thousands of routes, while each route likely further includes tens or even hundreds of road segments. Further, due to various reasons such as municipal construction, road planning, traffic management and the like, the road segments in one route could vary with time. For example, statistics shows that there would be 7%-13% of the routes changing in average each month, which will cause corresponding updates of a considerable percentage of trajectory patterns.

It has been proposed to generate a road network using various methods, such as a grid-based method. Afterwards, the original GPS data collected by the vehicle can be mapped to the road network, so as to infer a trajectory pattern using Welch test. However, the process per se of generating a road network has a high computational complexity and a time cost. In many cases such as location data missing for some segments, low location data precision, and complex segments existing in the route result in generation of the road network to be error-prone. Additionally, the precision of the road network likely exceeds the precision requirement on the trajectory pattern in applications such as fleet management, which causes wastes of computational resources.

SUMMARY

Generally, embodiments of the present invention provide a technical solution for accurately and efficiently obtaining a trajectory pattern of a route.

In one aspect, embodiments of the present invention provide a method for obtaining a trajectory pattern of a route. The method includes obtaining a set of points associated with the route, the set of points being obtained by at least one entity travelling along the route. A plurality of coverage areas covering a part of points in the set of points is determined. The coverage areas are connected based on main directions of the coverage areas to obtain the trajectory pattern related to the route. The main directions represent forward directions of the route in respective coverage areas.

In another aspect, embodiments of the present invention provide a system for obtaining a trajectory pattern of a route. The system includes a point set obtaining unit configured to obtain a set of points associated with the route, the set of points being obtained by at least one entity travelling along the route. A coverage determining unit is configured to determine coverage areas covering a part of points in the set of points. Also, a global connecting unit is configured to connect the coverage areas based on main directions of the coverage areas to obtain the trajectory pattern related to the route. The main directions represent forward directions of the route in respective coverage areas.

According to the embodiments of the present invention, the trajectory pattern of a route is obtained using coverage areas, not directly based on the location points per se as sensed. In this way, the computational burden can be significantly reduced, and the computing efficiency is enhanced. More importantly, by appropriately selecting coverage areas, noise points introduced in the set of points due to causes such as sensing error can be eliminated, thereby enhancing the accuracy of obtaining the trajectory pattern. Moreover, the global connection of the coverage can effectively handle various potential problems such as location data miss, location data imprecision, and complex road segments. Other features and advantages of the present invention will become easily comprehensible through the description below.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein.

Throughout the drawings, same or like reference numerals are used to represent the same or like components.

DETAILED DESCRIPTION

Preferred embodiments will be described in detail with reference to the accompanying drawings, in which the preferable embodiments of the present invention have been illustrated. The present invention can be implemented in various manners, and thus should not be construed to be limited to the embodiments illustrated herein.

Figure 1:
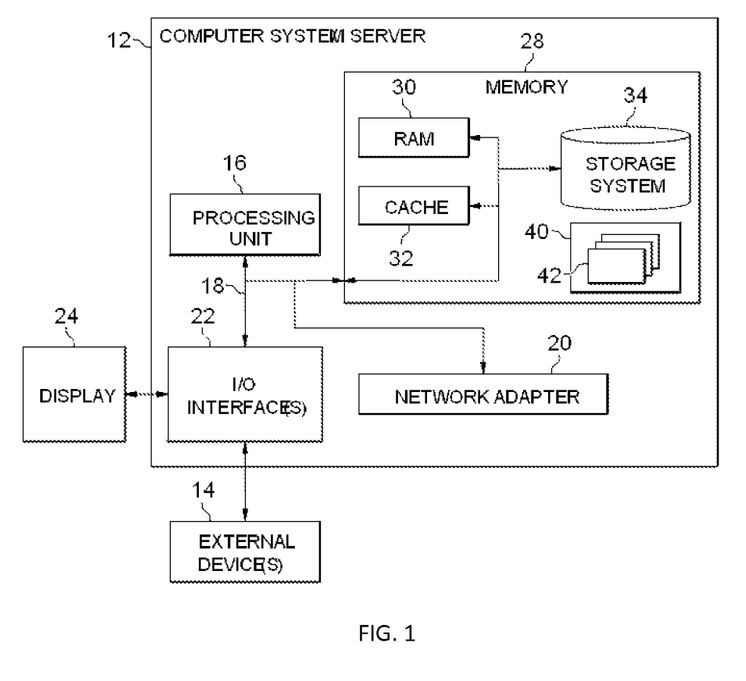
FIG. 1 shows an exemplary computer system/server which is applicable to implement the embodiments of the present invention.

As show in FIG. 1, in which an exemplary general-purpose computer system/server 12 applicable to implement the embodiments of the present invention is illustrated. Computer system/server 12 is only illustrative and is not intended to suggest any limitation as to the scope of use or functionality of embodiments of the invention described herein.

The components of computer system/server 12 can include at least one processor or processing unit 16, a system memory 28, and a bus 18 that couples various system components including system memory 28 to processor 16.

Bus 18 represents at least any one of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by at least one data media interface. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, at least one application program, other program modules, and program data. Each of the operating systems, at least one application program, other program modules, and program data or some combination thereof, can include an implementation of a networking environment. Program modules 42 generally carry out the functions and/or methodologies of embodiments of the invention as described herein.

Computer system/server 12 can also communicate with at least one external device 14 such as a keyboard, a pointing device, a display 24, etc. At least one device that enables a user to interact with computer system/server 12 and/or any devices (e.g., network card, modem) that enable computer system/server 12 to communicate with at least one other computing device. Such communication can occur via Input/Output (I/O) interfaces 22. Computer system/server 12 can communicate with at least one network such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems.

Hereinafter, the mechanism and principle of the embodiments of the present invention will be described in detail. Unless otherwise stated, the term "based on" used hereinafter and in the claims expresses "at least partially based on." The term "comprise" or "include" or a similar expression indicates an open inclusion, i.e., "including, but not limited to . . . ." The term "plural" or a similar expression indicates "two or more." The term "one embodiment" indicates "at least one embodiment." The term "another embodiment" indicates "at least one another embodiment." Definitions of other terms will be provided in the description infra.

Figure 2:
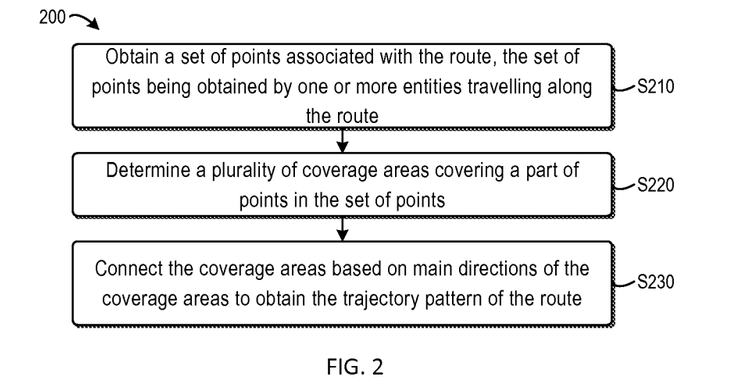
FIG. 2 shows a schematic flow diagram of a method for obtaining a trajectory pattern of a route according to the embodiments of the present invention.

FIG. 2 shows a schematic flow diagram of a method 200 for obtaining a trajectory pattern of a route according to the embodiments of the present invention. Generally, in the context of the present invention, a route is a directional route having a direction. As far as one route is concerned, the traveling direction of a vehicle and/or pedestrian traveling along the route is called the "forward direction" of the route. For a route allowing two-way traffic in the real world, it will be handled as two independent routes in opposite directions in the context of the present invention.

As shown in the figure, the method 200 starts from step S210, in which a set of points associated with a route is obtained. Each point in the set of points represents a location in the real world. According to the embodiments of the present invention, a set of points associated with the route can be obtained by a plurality of entities traveling along the route. The term "entity" used here refers to any object or device whose location can be sensed. Examples of an entity include, but not limited to, a motor vehicle, rickshaw, pedestrian, etc. In particular, in the context of the present invention, when the same vehicle or pedestrian travels along the same route at different time, the vehicle or pedestrian will be regarded as two different entities. In particular, in one embodiment, the information of the entity of each point can be recorded and obtained.

Each entity is equipped with a location sensing device. Examples of such devices include, but not limited to, at least one of the following: a GPS receiver, Galileo positioning system receiver, and Beidou navigation positioning system receiver. With the location sensing device, each entity can obtain location data of a plurality of locations during the traveling process. In one embodiment, the location data, for example, can be altitude and latitude data. Optionally, the location data can also comprise velocity data and direction data and the like of the entity at a corresponding location. By mapping the location data obtained by each entity traveling along the route onto a map, a set of points associated with the route can be formed.

In particular, it would be appreciated that location data can have errors. For example, in an embodiment of sensing locations with GPS, there could be couples or dozens of meters error distance between the GPS data and the actual location. As is already known, error of the GPS data can be related to various factors such as the velocity of the entity, occlusion, height of surrounding objects (e.g., buildings), etc. Therefore, when the location data are mapped on the map, the resulting points likely do not strictly fall onto the route. To this end, in one embodiment, the set of points obtained in step S210 includes points obtained by more than one entity. Such a practice will be advantageous. By using location data obtained by a plurality of entities, adverse impact caused by individual location sense error on subsequent processing can be reduced. Therefore, a central line of the route can be identified more accurately. Detailed description of this aspect will be provided infra.

Although the points collected by a plurality of entities are advantageous, the scope of the present invention is not limited thereto. On the contrary, the embodiments of the present invention are likewise applicable to a set of points that is obtained by one entity.

The method 200 proceeds to step S220 in which a plurality of coverage areas covering a part of points in the set of points are determined. It should be noted that, in the context of the present invention, "a part of" represents "at least one part." Therefore, in one embodiment, a coverage area covering all points in the set of points can be determined.

According to the embodiments of the present invention, the trajectory pattern is not directly obtained based on the points in the set of points. On the contrary, the basis for obtaining the trajectory pattern is a coverage area. The coverage area can also be called a point cover. Each coverage area is an area of a particular size, capable of covering at least one point in the set of points. In this way, a considerable amount of points in the set of points can be represented by a few coverage areas. For example, for a set of points having 100,000 points, most of the points (e.g., above 80%) can be covered only using hundreds or even thousands of coverage areas. By using coverage areas as connection nodes in the global connection, the computational complexity and cost can be significantly reduced, and the operating efficiency can be enhanced.

According to the embodiments of the present invention, the coverage area can have any appropriate shape and size. For example, in one embodiment, the coverage area can be round. Such a coverage area is called "cover round." In alternative embodiments, the coverage area can have any appropriate other shapes, e.g., rectangle, oval, rhombus, etc. Although the cover round can be used as an example of coverage area hereinafter and in the drawings, it is only for those skilled in the art to understand the principle of the present invention, not intended to limit the scope of the present invention in any manner. Moreover, in one embodiment, all coverage areas can have the same shape. Alternatively, in another embodiment, different coverage areas can have different shapes.

The size of the coverage area can be set based on any appropriate factors. In one embodiment, the size of an average area can be determined based on error distance between the points to be covered. The error distance of the points can be estimated using an error distance of a location sensing technology. For example, if a location of a point in the set of points is sensed with a GPS technology, and the average error distance sensed by the GPS is 30 meters, then the error distance of the points in the set point can be estimated as 30 meters. When a plurality of location sensing technologies having different error distances are used, the average value, maximum value, minimum value of these error distances, or an appropriate values calculated based on these error distances can be used as the radius of the cover round.

In an embodiment using a cover round, the radius of the cover round can be set to the average error distance between points. The size of the coverage area of other shape can also be set correspondingly based on the error distance between points. For example, a side length of a rectangle can be set as the error distance between points.

It will be advantageous to set the size of the coverage based on the error distance between points. By using such a coverage area to extract a trajectory pattern, the location sense error can be complemented such that the obtained trajectory pattern fits more the actual central line of the route. For example, in one embodiment, the size of the coverage area can be determined based on experiments or experience, and can also be designated by the user.

As mentioned above, in one embodiment, the coverage area can cover all points in the set of points. However, it would be appreciated that the precision of location data of some points can be rather low. For example, when the entity has a relatively low velocity or is stationary, the error of collected location data will be much larger. When the entity passes along a higher building or other object, the sensing precision of the location data can also be affected. The location sensing device per se equipped by some entities can have a lower precision. Thus, the error of the points obtained by such entity will be generally larger.

In order to exclude these potential problem points out of the subsequent processing, in such an embodiment, the coverage area can only cover a part of points in the set of points. More specifically, in such an embodiment, the coverage area can only be made to only cover points with a higher hot degree in the set of points. Here, the term "hot degree" means the importance or contribution of a point in the set of points to obtaining the trajectory pattern. According to the embodiments of the present invention, the hot degree of any given point can be determined based on various factors.

In one embodiment, the hot degree can be determined based on the velocity of a point. As mentioned above, in one embodiment, the velocity data of a point can be obtained as a part of location data. For example, those skilled in the art know that when using a GPS sensing technology, besides the location data, the velocity of the entity at various locations can be detected. Generally, the higher the velocity of the entity at one location is high, the higher is the precision of the location data. When the entity moves at a low velocity or is stationary, the precision of the location data will drop accordingly. Therefore, the hot degree of the point can be raised with the increase of the velocity. In one embodiment, points whose velocity is lower than a predetermined threshold velocity can be excluded out of the subsequent processing. Therefore, it can be guaranteed that the points covered by a coverage area are all points with a higher velocity.

Alternatively or additionally, the hot degree of a point is also correlated to a density of points in a proximity. Specifically, for each point in the set of points, a density of points with a predetermined proximity with the point as the center can be calculated. If the point density within the proximity of a given point is lower than a predetermined threshold, it indicates that the given point is an "isolated point." Appearance of the isolated point is very likely caused by location sensing error. Specifically, when the location sensing error is located within a reasonable range, the point will be distributed along a central line of the route. It would be appreciated that most points in the set of points would be such points. Otherwise, if the location sensing error is too large, the corresponding points can be apparently deviated from the route, thereby forming an isolated point. In order to enhance the precision of subsequent processing, the isolated points apparently deviated from the route can be excluded beyond the coverage area. In one embodiment, the hot degree of the point can be enhanced with the increase of the density of the points in the proximity.

It would be appreciated that the above described factors for determining a hot degree are only exemplary, not intended to limit the scope of the present invention in any manner. Any appropriate factors can be used to determine the hot degree of a point in the set of points. In particular, in one embodiment, the hot degree can be designated by the user. For example, the user can designate one or road segments in a route as important road segments, and the hot degree of the points associated with the important road segments can be set a higher value. Other ways of determining the hot degree of a point is likewise feasible.

In one embodiment, the hot degree can be qualitatively represented. Alternatively or additionally, the hot degree can also be quantitatively represented. For example, in an embodiment of determining the hot degree based on the velocity of point and the hot density in the proximity, the numerical value of the hot degree can be determined based on the numerical values of the velocity and density. As an example, the numeral values of the velocity and density can be normalized, respectively, and then the normalized numeral values are subject to any appropriate operation such as summing, multiplication, and averaging, and the result is defined as the hot degree value of the point. Of course, any other way of computing the hot degree value is feasible.

Based on the hot degree of the point, in step S220, the coverage area can be determined such that the points whose hot degrees are greater than a predetermined threshold in the set of points fall into one of the coverage areas. Therefore, for example, it can be guaranteed that the points covered by the coverage area have a larger velocity and therefore have a higher location precision. Alternatively or additionally, it can also be guaranteed that the density in the middle point of the coverage area is sufficiently enough. Through extracting the trajectory pattern of the route using such coverage area, the adverse impacts brought by the location sensing error can be eliminated as far as possible and the processing efficiency can be enhanced.

Alternatively, when the coverage areas are determined in step S220, the number of coverage areas needed for covering all or a part of points (e.g., the points whose hot degrees are greater than the predetermined threshold) in the set of points is minimized. Generally, for the same number of to-be-covered points, the smaller the overlapped portion between the coverage areas is, the less is the number of coverage areas needed. In a preferred embodiments, various different methods can be used to determine the minimum number of coverage areas as needed.

As an example, in one embodiment, this problem can be solved through kernel density estimation. For the purpose of discussion, suppose the coverage area is implemented as a coverage round. First, a plurality of candidate coverage rounds can be generated with each point in the set of points as the center of the round. As stated above, in one embodiment, the radius of the candidate coverage round can be the error distance of the location sensing technology.

For each candidate coverage round, a kernel function can be calculated. For example, in one embodiment, Gaussian kernel $\mu=(x, y, H)$ can be used, wherein x and y are coordinates of a point, H is the hot degree of the point. The standard deviation of the Gaussian kernel for example can be set to $\sigma=r/n$, wherein r, for example, is an error distance of the location sensing technology; n is a natural number, which, in one embodiment, can be set to 3. Afterwards, these Gaussian kernels are spatially overlapped, and the overlapped Gaussian kernels are sorted in descending order. Next, the minimum number of the coverage areas needed for covering a given subset of a set of points is determined. It would be appreciated that it is a combinatorial optimization issue, which can be resolved using various currently known or future developed algorithms such as greedy algorithm.

Besides the kernel density estimation, other appropriate methods can be used to determine the minimum number of coverage rounds. For example, in one embodiment, a genetic algorithm can be used. Specifically, a predetermined number of candidate coverage areas can be randomly selected as an initial population. Next, based on the hot degree of the points covered by these candidate coverage areas, a fitness of each coverage area can be determined. Based on the fitness, the individuals in the initial population can be subject to operations like selection, crossover, mutation and the like, thereby generating a next generation of population from the initial population. In this way, through generations of evolution, the minimum number of coverage areas capable covering the predetermined subset in the set of points can be finally determined. Using the kernel density estimation and genetic algorithm to determine the minimum coverage area is only out of the purpose of illustration, not intended to limit the scope of the present invention in any manner. It would be appreciated that in the case of a part of to-be-covered points in a given set of points, determining the minimum number of coverage areas is actually an optimization issue in a constraint condition. Any currently known or future developed appropriate methods can be applied to solve this problem, and the scope of the present invention is not limited to in this aspect.

In FIG. 2, the method 200 then proceeds to step S230, in which based on the main direction of the coverage areas, a global connection is executed to the coverage area in step S220 in obtaining a trajectory pattern of the route. In the context of the present invention, a connection of any two coverage areas refers to connecting two points located in the two coverage areas, respectively, rather than merging the coverage areas. For example, in one embodiment, the connection of two coverage areas can be realized by connecting central points, gravity centers or any appropriate points of the coverage areas. As an example, in an embodiment using a coverage round, connection of coverage areas can be implemented by connecting the centers of the rounds. In this manner, lines connecting coverage areas can act as the trajectory of the processed route.

According to the embodiments of the present invention, the globally connected nodes are coverage areas, rather than points in the set of points. In one embodiment, starting from the initial coverage area, the connection operation can be performed in a stepped manner. In this way, according to the embodiments of the present invention, the trajectory pattern of the route is obtained according to the needs. When one coverage area is processed, various needed computations are executed to the coverage area, e.g., determining the main direction, etc. In this way, the overheads for the computational resources and storage resources can be significantly reduced.

According to the embodiments of the present invention, the initial coverage area can be selected through various different manners. For example, in one embodiment, a coverage area closest to the start of the route can be selected, and the global connection is performed from the coverage area. Alternatively, in another embodiment, the initial coverage can be designated by the user.

In particular, in one embodiment, the initial coverage area can be selected based on a guide point. Specifically, in order to provide necessary ancillary information to the global connection so as to promote the precision of obtaining the trajectory pattern, at least one guide point can be set along the route. The guide points can be regarded as points at trusted locations. The guide points can be designated by the user or landmark nodes having a stable location on the route. For example, as far as a bus route is concerned, the guide points can be at least one bus stop. For an inter-city route, the guide points can be at least one city between the departure to the destination.

In an embodiment having guide points, a route can be partitioned into a plurality of segments, and the global connection can be executed based on the segments. Each segment is defined by two consecutive guide points. When performing a coverage area connection for any segment, the initial coverage area can be selected based on the initial guide point. The initial guide point can be associated with at least one coverage area. In one embodiment, a coverage area whose central position is closest to the location of the initial guide point can be selected as the initial coverage area. Of course, other selection mechanisms such as random selection are likewise feasible.

Starting from the initial coverage area, the global connection is executed in a stepped manner. During this process, for any currently processed coverage area, the subsequent coverage area to be connected will be selected based on the main direction of the coverage area. The term "main direction" used here refers to forward estimation of the route in the current coverage area. Generally, the main direction of the coverage area is determined based on the forward direction of respective points in the coverage area.

Figure 3:
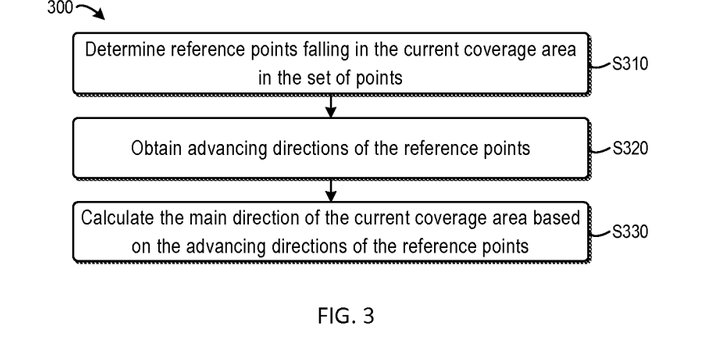
FIG. 3 shows a schematic flow diagram of a method for determining a main direction of a coverage area according to the embodiments of the present invention.

In FIG. 3, a schematic flow diagram of a method for determining a main direction of a coverage area according to the embodiments of the present invention is presented. The method 300 starts from step S310, in which points falling in the current coverage area in the set of points are determined. For the convenience of discussion, these points are called "reference points."

Next, in step S320, advancing directions of the reference points is obtained. In one embodiment, for each reference point, the direction between the reference point and the successive neighboring point is used as the advancing direction. The term "successive neighboring point" used here refers to the point obtained by the same entity as the reference point and immediately successive to the reference point in terms of location. In other words, if a vector is constructed between the reference point and the adjacent point, then the reference point is the start point of the vector, and the successive adjacent point is the termination of the vector. In this way, the determined advancing direction reflects the moving direction of the entity when obtaining the reference point.

Of course, other manners can also be used to obtain the advancing direction of the reference point. For example, some location sensing technologies can detect the moving direction of the entity. At this point, the direction data can be detected and stored as a part of location data. Correspondingly, the moving direction of the reference point can be directly read from the location data of the reference point as the advancing direction. Any other appropriate manner is feasible.

Next, in step S330, a main direction of the current coverage area is determined based on the advancing direction of the reference point in the current coverage area. For example, in one embodiment, a vector sum of the advancing directions of all reference points can be calculated, and the result is used as the main direction of the coverage area. Alternatively, in one embodiment, different weights can be granted for advancing directions of different reference points when calculating the vector sum. For example, the advancing direction of a reference point with a higher velocity can have a higher weight. In one embodiment, the weights of respective reference points can also be associated with the guide points (if available), which will be discussed hereinafter.

Figure 4:
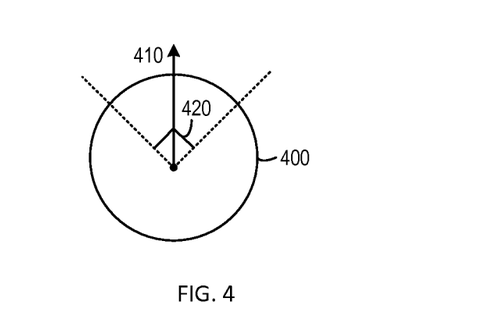
FIG. 4 shows a schematic diagram of a search angle and a search distance for a coverage according to the embodiments of the present invention.

After the main direction of the current coverage area is determined in step S230 of the method 200, a search angle for the current coverage area can be determined based on the main direction. Generally, the search angle can have a predetermined size, and the main direction is included within a sector defined by the search angle. In particular, in one embodiment, the main direction can be an angle bisector. Only for exemplary purpose, FIG. 4 shows an example of a search angle. In this example, the coverage area is a coverage round 400 having a main direction 410. In this example, the search angle 420 is set to 90 degrees, and the main direction 410 is the angle bisector of the search angle 420.

Based on the determined search angle, a successive search area to be connected with the current coverage area can be searched according to a predetermined search distance. The search distance can be any predefined distance. As an example, in one embodiment, the search distance can be determined based on an error distance of points in the set of points. For example, a multiple (e.g., 1×, 2×, etc.) of the error distance can be used as the search distance. Use of such search distance helps to compensate for the errors in the location sensing. Of course, the scope of the present invention is not limited thereto, and any other search distance is possible.

The search angle and search distance together define the search range of the current coverage area. In this search range, if at least one coverage area is searched, this or these search areas are determined as candidate coverage areas. Next, one coverage area can be selected from among these candidate coverage areas as the successive coverage area so as to be connected with the current coverage area. In this aspect, any appropriate route search algorithm can be used to select one successive coverage area from among a plurality of candidate coverage areas. For example, in one embodiment, the Dijkstra algorithm can be used to select a successive coverage area. Alternatively, the A-Start algorithm or any currently known or future developed algorithms can also be used to perform a selection of a successive coverage area. Such algorithms per se are known and will not be detailed here.

After the successive coverage area is selected, the current coverage area can be connected with the successive coverage area. In one embodiment, central points of two coverage areas (e.g., center of the coverage round) can be connected. Of course, other connection manners are likewise feasible. Then, the connection operation proceeds to the successive coverage area. At this point, the successive coverage area changes to the current coverage area, and the main direction-based connection can be repeated. In this manner, global connection can be accomplished in a stepped manner.

In one embodiment, other candidate coverage areas that are not selected as the successive coverage area can also be saved. During a heuristic connection process, if selection of the successive coverage area is found improper after a plurality of steps of operations, backward operations can be performed. A successive coverage area is re-selected from the stored candidate coverage areas for connection.

In some cases, it is possible that no candidate coverage areas can be found within the search range defined by the search angle and the search distance. For example, when a vehicle or a pedestrian passes through a bridge or along other areas with occlusion, GPS signals are likely interrupted. Such area is called "blind area" of location sensing. Due to the existence of blind area, a larger gap can exist in spatial distribution of points in the set of points, which in turn causes a larger gap between coverage areas. For the coverage areas surrounding the gap, it is quite possible that no other coverage areas can be found within the search range.

According to the embodiments of the present invention, this problem can be solved through dynamic expansion of the search range. Specifically, for any given current coverage area, if no candidate coverage area is found within the initial search range, it can be allowed to expand the search distance. Then, the search can be performed again within the expanded search range. In one embodiment, the dynamic expansion of the search range can be performed for multiple times. In other words, if no candidate coverage areas are found within the expanded search range, it is allowed to expand the search range again.

Generally, the expansion of the search range can be realized by enlarging the search distance while maintaining the search angle unchanged. The reason is that enlarging the search distance can handle coverage area gaps caused by location data missing more directly and effectively. Moreover, excessive enlargement of the search angle can cause that the connection direction deviates from the actual direction of the route. In addition to expansion of the search distance or alternatively, the search angle can be expanded within an appropriate range.

Figure 5:
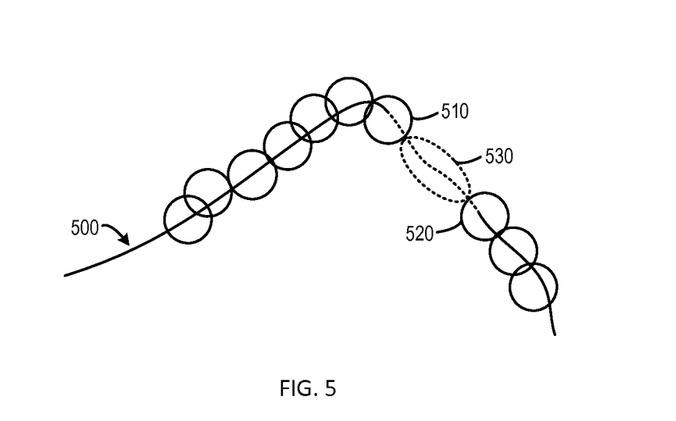
FIG. 5 shows a schematic diagram of impact of location data missing on a coverage area connection according to the embodiments of the present invention.

Dynamic expansion of the search range can effectively solve the gap between coverage areas caused by location sensing blind area. With reference to FIG. 5, suppose the initial search distance is the error distance of location sensing. If no candidate coverage area for the current coverage area 510 is found within the initial search area, the search range can be expanded through enlarging the search distance. In this example, suppose a coverage area 520 is found when the search distance is expanded to 4× error distance, then the coverage area 520 can be selected as the successive coverage area. In this way, the coverage area 510 can be connected to the coverage area 520, thereby skipping the gap 530 caused by location sensing blind area between the two coverage areas.

It would be appreciated that due to error in location sensing, some points in the set of points and mutual location relationships between points can have a greater error. In step S320 of the method 300, the main direction of the coverage area as calculated based on the advancing direction of such points can be deviated from the actual direction of the route. At this point, within the search angle determined based on the main direction, it is very likely that a correct successive coverage area cannot be found even using dynamic expansion of the search distance.

Figure 6:
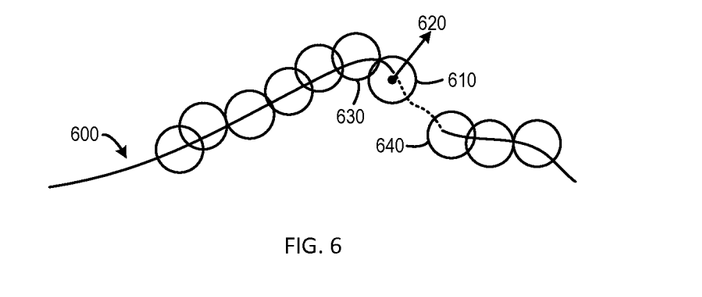
FIG. 6 shows a schematic diagram of a backward search in a coverage area according to the embodiments of the present invention.

As an example, refer to FIG. 6, in which the main direction of the coverage area 610 is supposed to be 620. It is seen that the main direction 620 is apparently deviated from the actual direction of the route 600 in the coverage area 610, which can be caused by a larger location sensing error of the points in the coverage area 610. At this point, within the search direction determined based on the main direction 620, regardless of how to expand the search distance, the successive coverage area for the coverage area 610 cannot be found. Therefore, in one embodiment, an upper limit threshold of the search distance can be set. When the search distance through once or multiple times of expansion reaches or exceeds the upper limit threshold, the search for the current coverage area will be stopped. Thus, the current coverage area is determined as a wrong coverage area. In this case, the operation can return to a previous coverage area connected to the current coverage area to search again, so as to "skip" the wrong coverage error.

In FIG. 6, a previous coverage area 630 for the current coverage area 610 is illustrated. Then, the previous search distance for the previous coverage area is expanded. Only exemplarily, suppose the previous search distance for the previous search area 630 is an error distance of location sensing. In this case, the previous search distance for the previous coverage area 630 can be expanded to 2× error distance. Then, the candidate coverage areas for the previous coverage area 630 are searched again with the expanded previous search distance. Consequently, another candidate coverage area for the coverage area 640 as the coverage area 630 can be found. In this way, the error coverage area 610 can be skipped to guarantee that the global connection can proceed in a correct direction.

In another aspect, if only one candidate coverage area (i.e., coverage area 610) can be found within the expanded search distance, the search distance of the previous search area 630 can be expanded again. In one embodiment, if the search distance of the previous coverage area 630 reaches the upper limit threshold through at least one time of expansion, the backward operation can proceed again from the previous coverage area 630.

In particular, in the new search, besides the coverage area 640, the coverage area 610 can be still determined as a candidate coverage area for the coverage area 630. However, since the coverage area 610 per se does not have any successive coverage area, the connection algorithm (e.g., Dijkstra algorithm or A-Star algorithm) will finally select the coverage area 640 to be connected to the coverage area 630. In this way, the error coverage area 610 can be skipped. Alternatively, in another embodiment, the error coverage area 610 can be directly flagged, such that in the search again with respect to the coverage area 630, the error coverage area 610 will not be selected as the candidate coverage area.

In one embodiment, in step S230, the global connection can be directly applied to the coverage area determined in step S220. Alternatively, as mentioned above, a plurality of guide points distributed along the route can be used to facilitate the global connection. Specifically, in such an embodiment, the route can be logically partitioned into segments based on the guide points, and coverage areas can be connected based on the segments.

Figure 7:
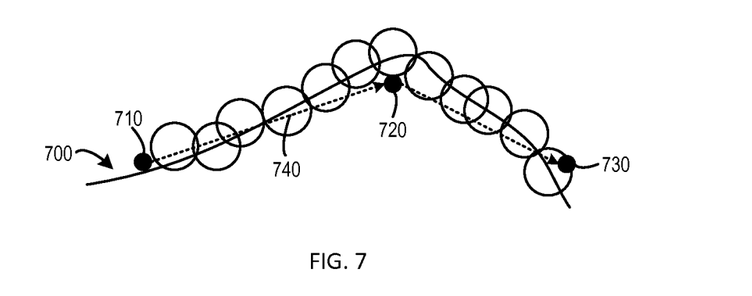
FIG. 7 shows a schematic diagram of performing coverage area connection using guide points according to the embodiments of the present invention.

FIG. 7 shows an example of performing global connection using guide points. In this example, suppose three guide points 710, 720 and 730 are set on the route 700. As stated above, each guide point is a point at a trusted location. It should be understood that the locations of the guide points shown in FIG. 7 are only exemplary, not intended to limit the scope of the present invention. According to the embodiments of the present invention, the guide points can be located on the route or surrounding the route. Moreover, the guide points can fall within a certain coverage or beyond all coverage areas.

By sequentially connecting the three guide points 710, 720, and 730, a high-level virtual guide network can be formed, which can be used to guide connection of the coverage areas. In this way, the route is partitioned into a plurality of segments logically based on the guide points. Afterwards, connection of coverage areas can be executed based on the segments. For example, in the example of FIG. 7, the coverage areas between the guide points 710 and 720 can be connected first, and then the coverage areas between the guide points 720 and 730 can be connected.

It would be advantageous to connect coverage areas based on segments, because the guide points provide a general guidance for the connection in terms of direction and/or distance. It would be appreciated that in an actual route, road segments such as loop line (e.g., roundabout), overpass, etc. When a vehicle or pedestrian travels along such road segments, its traveling direction can have a ring shape or a junction shape, which likely affects the accuracy of the main direction of the corresponding coverage area. Use of the guide points can effectively solve this problem.

For example, in one embodiment, the direction of each segment can be determined based on the direction of the connecting line between two guide points, which can be called "guide direction." As an example, FIG. 7 shows a guide direction 740 directed from the guide point 710 to the guide direction 720. When determining the main direction of the coverage area, the guide direction can be taken into account. In one embodiment, when the main direction of the coverage area is determined in step S330 of the method 300, the advancing direction of each reference point can be compared with a guide direction. If the deviation between the advancing direction of a reference point and the guide direction is smaller than the predetermined threshold, the advancing direction can be assigned a higher weight. Otherwise, the advancing direction with a larger deviation from the guide direction can be assigned a lower weight. In particular, the weight of those advancing directions that are apparently deviated from the main direction is set to zero. In this case, the main direction of the coverage area is calculated only based on the advancing direction consistent with the guide direction. In this way, the adverse impact caused by loop shaped or junction shaped road segments to the search of coverage areas can be effectively avoided. Therefore, the connection of coverage areas can be implemented more accurately.

Of course, it should be understood that other manners can be adopted to facilitate search of a successive coverage area using the information provided by the guide point. As an example, in one embodiment, the global connection method can be adjusted (e.g., Dijkstra algorithm or A-Star algorithm), such that the candidate coverage area closer to the next guide point is selected as a successive coverage area. Any other appropriate method is feasible.

Alternatively or additionally, the guide point can be used in conjunction with expansion of the search range in coverage area connection. As stated above, in one embodiment, when the expanded search distance reaches the upper limit threshold, the expansion will be stopped and return to the previous coverage area. In one embodiment, the distance of a guide segment where the current coverage is located can be determined. The distance of the guide segment can be defined as a map distance or a direct-line distance between corresponding guide points. Correspondingly, the upper limit threshold for expansion of the search distance can be determined based on the distance of the corresponding segment. For a coverage area, if the expanded search distance has exceeded the distance of the segment where the coverage area is located, but the candidate coverage areas are not found yet, it can be determined that the current coverage area has an error. In this manner, the upper limit threshold for the search distance expansion will have a more explicit physical meaning, thereby more accurately and effectively controlling search of the successive coverage area to be connected.

Figure 8:
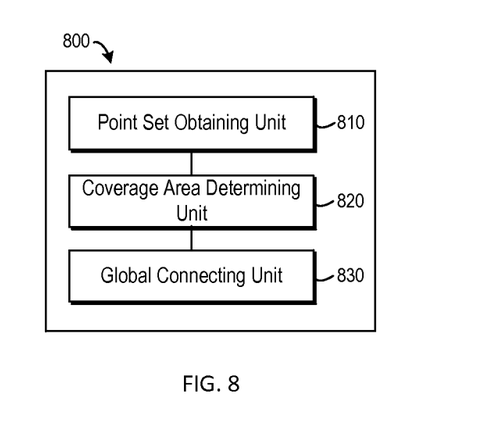
FIG. 8 shows a schematic block diagram of a system for obtaining a trajectory pattern of a route according to the embodiments of the present invention.

FIG. 8 shows a schematic block diagram of a system 800 for obtaining a trajectory pattern of a route according to the embodiments of the present invention. As shown in the figure, the system 800 includes a point set obtaining unit 810 configured to obtain a set of points associated with the route, the set of points being obtained by at least one entity travelling along the route. A coverage determining unit 820 is configured to determine the coverage areas covering a part of points in the set of points. A global connecting unit 830 is configured to connect the coverage areas based on main directions of the coverage areas to obtain the trajectory pattern related to the route. The main directions represent forward directions of the route in respective coverage areas.

In one embodiment, the coverage area determining unit 820 can include a first coverage area determining unit configured to determine the coverage area covering the part of points, such that a number of the coverage areas is minimum.

In one embodiment, the coverage area determining unit 820 can include a hot degree determining unit configured to select the part of points based on hot degrees of the points in the set of points. The hot degree of a given point in the set of points is determined based on at least one of the following: velocity of the given point and point density within a proximity where the given point is located.

In one embodiment, the coverage area determining unit 820 can include a coverage area size determining unit configured to determine a size of the coverage areas based on an error distance of the part of points.

In one embodiment, the global connecting unit 830 can include a main direction determining unit configured to determine the main direction of a current coverage area.

In one embodiment, the main direction determining unit can include a reference point determining unit configured to determine reference points falling in the current coverage area in the set of points. An advancing direction obtaining unit is configured to obtain advancing directions of the reference points. Additionally, a main direction calculating unit is configured to calculate the main direction of the current coverage area based on the advancing directions of the reference points.

In one embodiment, the advancing direction obtaining unit can include an advancing direction determining unit configured to determine the advancing direction of at least one reference point in the reference points based on a location relationship between at least one reference point and a successive neighboring point. The successive neighboring point and at least one reference point being obtained by a same entity of the at least one entity.

In one embodiment, the global connecting unit 830 can include a search angle determining unit configured to determine a search angle for the current search area based on the main direction of the current coverage area. Additionally, a search unit configured to search a successive coverage area can be connected to the current coverage area within a predetermined search distance based on the search angle.

In one embodiment, the global connecting unit 830 can further include a search distance expanding unit configured to expand the search distance in response to not finding the successive coverage area within the search distance. Additionally, a new search unit can be configured to search the successive coverage area to be connected to the current coverage area within an expanded search distance.

In one embodiment, the global connecting unit 830 can further include a previous search distance expanding unit configured to expand a search distance of a previous coverage area connected to the current coverage area in response to not finding the successive coverage area within the expanded search distance. Additionally, a backward searching unit can be configured to search again a successive coverage area for the previous coverage area to be connected to the previous coverage area within an expanded previous search distance.

In one embodiment, the global connecting unit 830 can include a guide point set obtaining unit configured to obtain a plurality of guide points associated with the route, each of the guide points is a point at a trusted location. A route partitioning unit can be configured to partition the route into a plurality of segments based on the plurality of guide points. Finally, a segment connecting unit can be configured to connect the coverage areas based on at least one of directions and distances of the segments.

It should be noted that for the sake of clarity, FIG. 8 does not show optional units or sub-units included in the system 800. All features and operations as described above are suitable for system 800, respectively, which are therefore not detailed here. Moreover, partitioning of units or subunits in system 800 is exemplary, rather than limitative, intended to describe its main functions or operations logically. A function of one unit can be implemented by a plurality of other units. Also, a plurality of units can be implemented by one unit. The scope of the present invention is not limited in this aspect.

Moreover, the units included in the system 800 can be implemented by various manners, including software, hardware, firmware or a random combination thereof. In some embodiments, the apparatus can be implemented by software and/or firmware. Alternatively or additionally, the system 800 can be implemented partially or completely based on hardware. At least one unit in the system 800 can be implemented as an integrated circuit (IC) chip, an application-specific integrated circuit (ASIC), a system on chip (SOC), a field programmable gate array (FPGA), etc. The scope of the present intention is not limited to this aspect.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of at least one programming language, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams can represent a module, segment, or portion of code, which includes at least one executable instruction for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A computer-implemented method for obtaining a trajectory pattern of a route comprising:
    Obtaining, via a processor, a set of points associated with the route, the set of points being obtained by at least one entity travelling along the route;
    identifying, via the processor, a current coverage area in plurality of coverage areas in a search range comprising an initial search area covering a part of points in the set of points;
    determining, via the processor, whether the search range includes a blind area that-indicative of a location sensing gap that intervenes the current search area and a successive search area such that the current search area is unconnected with the successive search area;
    determining, via the processor, a main direction of the current coverage area;
    expanding the search range to an expanded search range in response to the successive coverage area being not found within the current search area, wherein the expanded search range comprises a search distance exceeding a search distance of the initial search area, and the expanded search range skips the sensing gap;
    connecting, via the processor, the current coverage area with the successive search area based on the main direction of the current coverage area to obtain the trajectory pattern related to the route, the main direction representing a forward direction of the trajectory pattern; and
    outputting an updated route to a display via an input/output interface, the updated route comprising the forward direction of the trajectory pattern.

2. The computer-implemented method according to claim 1, wherein the coverage areas are a minimized number of coverage areas required to cover the part of points in the set of points
    identifying, via the processor, a current coverage area in plurality of coverage areas in a search range comprising an initial search area.

3. The computer-implemented method according to claim 2, wherein identifying the current coverage area comprises:
    selecting the part of points based on hot degrees of the points in the set of points, wherein the hot degree of a given point in the set of points is determined based on at least one of the following: a velocity of the given point and a density of points in a proximity of the given point.

4. The computer-implemented method according to claim 1, wherein identifying the current coverage area comprises:
    determining a size of the coverage areas based on an error distance of the part of points.

5. The computer-implemented method according to claim 1, wherein determining the main direction of the current coverage area further comprises:
    determining reference points falling in the current coverage area in the set of points;
    obtaining advancing directions of the reference points; and
    calculating the main direction of the current coverage area based on the advancing directions of the reference points.

6. The computer-implemented method according to claim 5, wherein obtaining advancing directions of the reference points comprises:
    determining the advancing direction of at least one reference point in the reference points based on a location relationship between at least one reference point and a successive neighboring point, the successive neighboring point and at least one reference point being obtained by a same entity of at least one entity.

7. The computer-implemented method according to claim 1, wherein connecting the coverage areas based on main directions of the coverage areas further comprises:
    determining a search angle for the current search area based on the main direction of the current coverage area; and
    searching the successive coverage area to be connected to the current coverage area within a predetermined search distance based on the search angle.

8. The computer-implemented method according to claim 7, wherein connecting the coverage areas based on main directions of the coverage areas further comprises:
    searching the successive coverage area to be connected to the current coverage area within the expanded search distance.

9. The computer-implemented method according to claim 8, wherein connecting the coverage areas based on main the direction of the coverage area further comprises iteratively expanding the expanded search range and searching again, by:
  expanding the expanded search range; and
  searching again a successive coverage area for the previous coverage area to be connected to the previous coverage area within the expanded previous search distance.

10. The computer-implemented method according to claim 1, wherein connecting the coverage areas based on main directions of the coverage areas comprises:
  connecting the current coverage area with the successive search area based on a plurality of directions and distances of the segments.

11. A system for obtaining a trajectory pattern of a route, comprising:
  a point set obtaining unit configured to obtain a set of points associated with the route, the set of points being obtained by at least one entity travelling along the route;
  a coverage determining unit configured to identify a current coverage area in a plurality of coverage areas in a search range comprising an initial search area covering a part of points in the set of points; and
  a global connecting unit configured to
  determine whether the search range includes a blind area indicative of a location sensing gap that intervenes the current search area and a successive search area such that the current search area is unconnected with the successive search area;
  determine a main direction of the current coverage area;
  expand the search range to an expanded search range in response to the successive coverage area being not found within the search area, wherein the expanded search range comprises a search distance exceeding a search distance of the initial search area, and the expanded search range skips the sensing gap;
  connect the coverage area with the successive search area based on the main direction of the current coverage area to obtain the trajectory pattern related to the route, the main direction representing a forward direction of the trajectory pattern; and;
  a display operatively connected to an input/output interface, the display configured to output, via the input/output interface, the updated route comprising the forward direction of the trajectory pattern.

12. The system according to claim 11, wherein the coverage areas are a minimized number of coverage areas required to cover the part of points in the set of points.

13. The system according to claim 12, wherein the coverage area determining unit comprises:
  a hot degree determining unit configured to select the part of points based on hot degrees of the points in the set of points, wherein the hot degree of a given point in the set of points is determined based on at least one of the following: a velocity of the given point and a density of points in a proximity of the given point.

14. The system according to claim 11, wherein the coverage area determining unit comprises:
  a coverage area size determining unit configured to determine a size of the coverage area based on an error distance of the part of points.

15. The system according to claim 11, wherein the global connecting unit comprises a main direction determining unit configured to determine the main direction of a current coverage area, the main direction determining unit comprising:
  a reference point determining unit configured to determine reference points falling in the current coverage area in the set of points;
  an advancing direction obtaining unit configured to obtain advancing directions of the reference points; and
  a main direction calculating unit configured to calculate the main direction of the current coverage area based on the advancing directions of the reference points.

16. The system according to claim 15, wherein the advancing direction obtaining unit comprises:
  an advancing direction determining unit configured to determine the advancing direction of at least one reference point in the reference points based on a location relationship between at least one reference point and a successive neighboring point, the successive neighboring point and at least one reference point being obtained by a same entity of at least one entity.

17. The system according to claim 11, wherein the global connecting unit comprises:
  a search angle determining unit configured to determine a search angle for the current search area based on the main direction of the current coverage area; and
  a search unit configured to search a successive coverage area to be connected to the current coverage area within a predetermined search distance based on the search angle.

18. The system according to claim 17, wherein the global connecting unit further comprises:
  a search distance expanding unit configured to expand the search distance in response to the successive coverage area being not found within the search distance; and
  a search unit configured to search again the successive coverage area to be connected to the current coverage area within the expanded search distance.

19. The system according to claim 18, wherein the global connecting unit further comprises:
  a previous search distance expanding unit configured to expand a search distance of a previous coverage area connected to the current coverage area in response to the successive coverage area being not found within the expanded search distance; and
  a backward searching unit configured to search again a successive coverage area for the previous coverage area to be connected to the previous coverage area within the expanded previous search distance.

20. The system according to claim 11, wherein the global connecting unit comprises:
  a guide point set obtaining unit configured to obtain a plurality of guide points associated with the route, each of the guide points is a point at a trusted location;
  a route partitioning unit configured to partition the route into a plurality of segments based on the plurality of guide points; and
  a segment connecting unit configured to connect the coverage areas based on at least one of directions and distances of the segments.

* * * * *